US012600057B1

(12) United States Patent
Wallace

(10) Patent No.: US 12,600,057 B1
(45) Date of Patent: Apr. 14, 2026

(54) POTTERY HOLDING APPARATUS, SYSTEMS, AND METHODS FOR A CLAY WORKPIECE

(71) Applicant: Wallace Pottery LLC, Lakeville, MN (US)

(72) Inventor: Luka William Wallace, Lakeville, MN (US)

(73) Assignee: Wallace Pottery LLC, Lakeville, MN (US)

( * ) Notice: Subject to any disclaimer, the term of this patent is extended or adjusted under 35 U.S.C. 154(b) by 280 days.

(21) Appl. No.: 18/143,736

(22) Filed: May 5, 2023

Related U.S. Application Data

(60) Provisional application No. 63/338,525, filed on May 5, 2022.

(51) Int. Cl.
*B28B 1/02* (2006.01)

(52) U.S. Cl.
CPC .................................... *B28B 1/025* (2013.01)

(58) Field of Classification Search
CPC ...................................................... B28B 1/025
See application file for complete search history.

(56) References Cited

U.S. PATENT DOCUMENTS 3,366,393 A 1/1968 Bullard, III
3,751,053 A 8/1973 Swanson
3,849,054 A 11/1974 Jordache
4,222,577 A 9/1980 Giffin
4,434,684 A 3/1984 Nixon
4,585,240 A 4/1986 Giffin
5,244,376 A * 9/1993 Meyers .................... B28B 7/344 425/459
9,815,221 B1 * 11/2017 Warnock ............. B28B 11/0809
2023/0241802 A1 * 8/2023 Giffin ......................... B28B 1/20

OTHER PUBLICATIONS

"BatMate", https://rb.gy/r03gdm Date last accessed Aug. 1, 2024.
"Giffin Grip", https://www.giffingrip.com/ Date last accessed Aug. 1, 2024.
"Snap Bat, System W/Plastic", https://www.theceramicshop.com/product/26156/snap-bat-system-w-plastic/?gad_source=1&gclid=Cj0KCQjwkdO0BhDxARIsANkNcrdnHri0Erj7G-IZWh5lwxzpiHsLR6qBo0kKuEHA60G0q_AZLfsxNZ4aAgPSEALw_wcB Date last accessed Aug. 1, 2024.
"StudioPro", https://www.baileypottery.com/c-120-018.html?gad_source=1&gclid=Cj0KCQjwkdO0BhDxARIsANkNcrcgJygu_EZyw4tkWciBdRt9nXzEMAcsQhLITIIAM7cgi-b2vK8qEElaAn9CEALw_wcB Date last accessed Aug. 1, 2024.

* cited by examiner

*Primary Examiner* — John J DeRusso
(74) *Attorney, Agent, or Firm* — Billion & Armitage

(57) ABSTRACT

A device for securing a clay workpiece to a pottery wheel includes a base plate and a clay holding member. The base plate includes an alignment feature to at least partially receive a locating feature of the pottery wheel. The clay holding member includes a body extending from the base plate to an upper surface and an opening at the upper surface extending into the body. The clay holding member includes an inner surface defining a tapered shape. The tapered shape is symmetric about an axis of symmetry of the inner surface. The alignment feature is configured to align the axis of symmetry of the inner surface within an axis of rotation of the pottery wheel.

11 Claims, 14 Drawing Sheets

POTTERY HOLDING APPARATUS, SYSTEMS, AND METHODS FOR A CLAY WORKPIECE

BACKGROUND

The present disclosure relates generally to devices, systems, and methods for trimming a clay workpiece and more particularly to devices, systems, and methods for centering and supporting a wide range of clay workpieces on a pottery wheel head.

Creating a functional, wheel-thrown ceramic piece of art is a multipart process. In general, this process begins with the potter throwing the clay workpiece onto a pottery wheel head. The pottery wheel is configured to rotate about an axis of rotation, and the potter uses their hands to shape and form the clay workpiece as the wheel rotates. Once the clay workpiece is formed into a desired shape (i.e., a bowl, cup, vase, etc.), it is removed from the pottery wheel and dried to a leather-hard state. In the leather-hard state, the clay workpiece is firm enough for the potter to remove excess clay from the workpiece, typically from the foot or base of the clay workpiece. Before the excess clay removal process can occur (referred to hereinafter as "trimming"), the potter must attach and center the leather-hard clay workpiece to the pottery wheel. Centering and securing the leather-hard clay workpiece prior to trimming is a challenging and time-consuming task for most potters.

Potters use a variety of hand-centering methods to center the clay workpiece prior to trimming such as "tap centering" and "finger centering". Tap centering begins with the potter placing the workpiece on the wheel head. As the workpiece rotates on the wheel head, the potter taps the side of it in a rhythmic fashion. Once the workpiece has no visual concentric ambiguity relative to the rotational axis of the spinning wheel head, the potter will stop the wheel from spinning and carefully secure the workpiece by gently pressing wads of clay along the perimeter of the workpiece.

Finger centering begins with the potter placing the workpiece on the wheel-head. The potter will then position a finger on the side of the workpiece, and keeping the finger stationary, the potter will slowly rotate the wheel head. If a gap is visible between the potter's finger and the workpiece, the potter will stop the wheel head and reposition the workpiece so that the gap has been minimized. These steps are repeated until there is no separation found between the potter's finger and the clay workpiece for a full rotation. Again, like the tap centering method, the potter will then secure the workpiece to the wheel by wadding clay along the perimeter of the workpiece.

If the clay workpiece is improperly centered, the foot of the workpiece (the bottom portion of the workpiece) will be carved lopsidedly during the trimming process, ruining the aesthetic for the foot portion of the workpiece. If the clay workpiece is not properly secured to the wheel during the trimming process, the workpiece may begin to wobble causing the center point to continuously deviate from the wheel head's axis of rotation. In some cases, the workpiece may develop too much rotational momentum, resulting in the clay workpiece being propelled off the wheel.

The "Giffin Grip™" (U.S. Pat. No. 4,222,577) is device for centering a leather-hard clay workpiece prior to trimming. However, there are many limitations to the "Giffin Grip™" product. For instance, the device uses a radially adjustable guide mechanism which must be adjusted to center each clay workpiece, and the device requires a multipart assembly making it time-consuming and counter-intuitive to set up. Further, the "Giffin Grip™" is limited to workpieces with simple geometry (i.e., cylinders, mugs, bowls, plates). Complex workpieces, or workpieces of intricate design (i.e., non-uniformed pieces, vases, vessels, bottles) are incompatible with the "Giffin Grip™" because their complex structure prevents them from supporting their own weight on/at the mouth of the workpiece.

SUMMARY

The present inventor recognizes that there exists a need for a centering and holding device, system, and/or method that is intuitive in nature and has no preliminary assembly needed before use. Furthermore, a need exists for a novel centering and holding device, system, and/or method capable of accommodating a wide range of clay workpiece designs, including but not limited to, vases, vessels, and bottles.

According to some embodiments, a device for securing a clay workpiece to a pottery wheel includes a base plate and a clay holding member. The base plate includes an alignment feature to at least partially receive a locating pin of the pottery wheel. The clay holding member includes a body extending from the base plate to an upper surface and an opening at the upper surface extending into the body. The clay holding member includes an inner surface defining a tapered shape. The tapered shape is symmetric about an axis of symmetry of the inner surface. The alignment feature is configured to align the axis of symmetry of the inner surface within an axis of rotation of the pottery wheel.

According to some embodiments, a system for centering a clay workpiece on a pottery wheel includes a locating pin, a base plate, and a clay holding member. The locating pin is disposed on a wheel head of the pottery wheel. The base plate includes a pin coupling recess to receive the locating pin and a first engagement feature. The clay holding member includes an opening, an inner surface, and a second engagement feature. The inner surface defines a tapered shape symmetric about an axis of symmetry. The second engagement feature is removably securable to the first engagement feature. The clay holding member is removable from the pottery wheel independent of the base plate. Coupling the locating pin to the pin coupling recess aligns the axis of symmetry of the inner surface to an axis of rotation of the pottery wheel.

According to some embodiments, a method for centering a clay workpiece on a pottery wheel includes providing a base plate and a clay holding member. The base plate includes a pin coupling recess. The clay holding member includes an opening and an inner surface. The inner surface defines a tapered shape symmetric about a first axis of symmetry. The method includes coupling a locating pin of the pottery wheel to the pin coupling recess, removably securing the base plate to the clay holding member, and inserting the clay workpiece into the opening of the clay holding member. The clay workpiece includes a second axis of symmetry. The method further includes aligning the first axis of symmetry with the second axis of symmetry.

According to some embodiments, apparatus for securing a clay workpiece to a pottery wheel includes a base plate, a first fastener, a clay holding member, and a second fastener. The base plate includes a first engagement feature and at least two alignment features. The alignment features are engageable with corresponding locating pins disposed on the pottery wheel to secure the base plate to the pottery wheel symmetric about an axis of rotation of the pottery wheel. The first fastener is secured to the alignment plate. The clay holding member includes a base and an at least partial circumferential wall extending from the base to define a support opening spaced from the base. The base is configured for cooperative engagement with the first engagement feature of the base plate. The second fastener is secured to the clay holding member. The second fastener is engageable with the first fastener to removably secure the clay holding member to the base plate such that the at least partial circumferential wall extends circumferentially about the axis of rotation of the pottery wheel.

These and other examples and features of the present devices, systems, and methods will be set forth, at least in part, in the following Detailed Description. This Overview is intended to provide non-limiting examples of the present subject matter—it is not intended to provide an exclusive or exhaustive explanation. The Detailed Description below is included to provide further information about the present devices, systems, and methods.

BRIEF DESCRIPTION OF DRAWINGS

This written disclosure describes illustrative embodiments that are non-limiting and non-exhaustive. Reference is made to illustrative embodiments that are depicted in the figures, in which.

DETAILED DESCRIPTION

According to some embodiments, this disclosure relates to devices, systems, and methods for securing a clay workpiece to a pottery wheel prior to trimming excess clay from the workpiece.

Figure 1A:
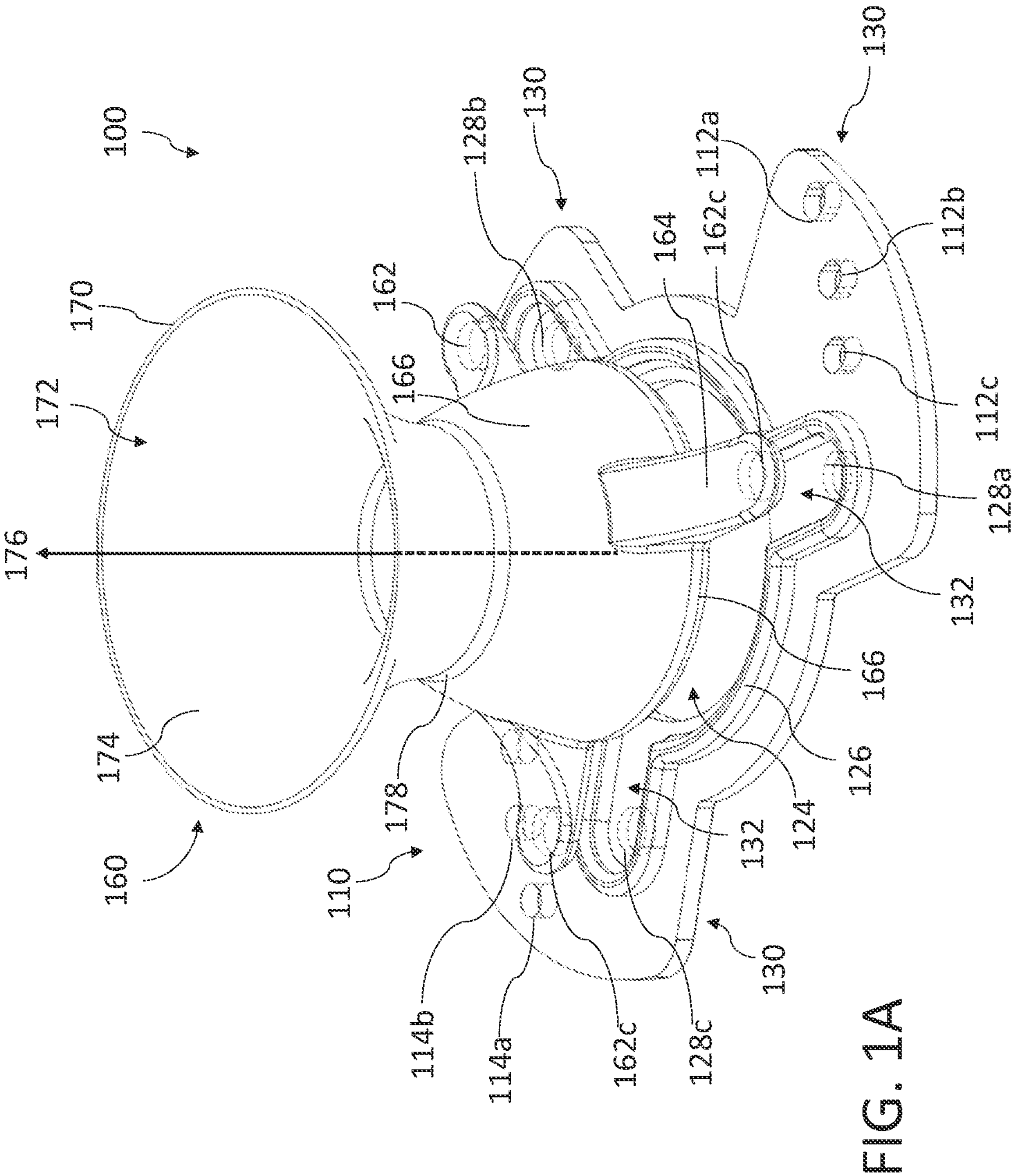
FIG. 1A illustrates an exploded isometric view of an apparatus for securing a clay workpiece to a pottery wheel, according to some embodiments.
Figure 1B:
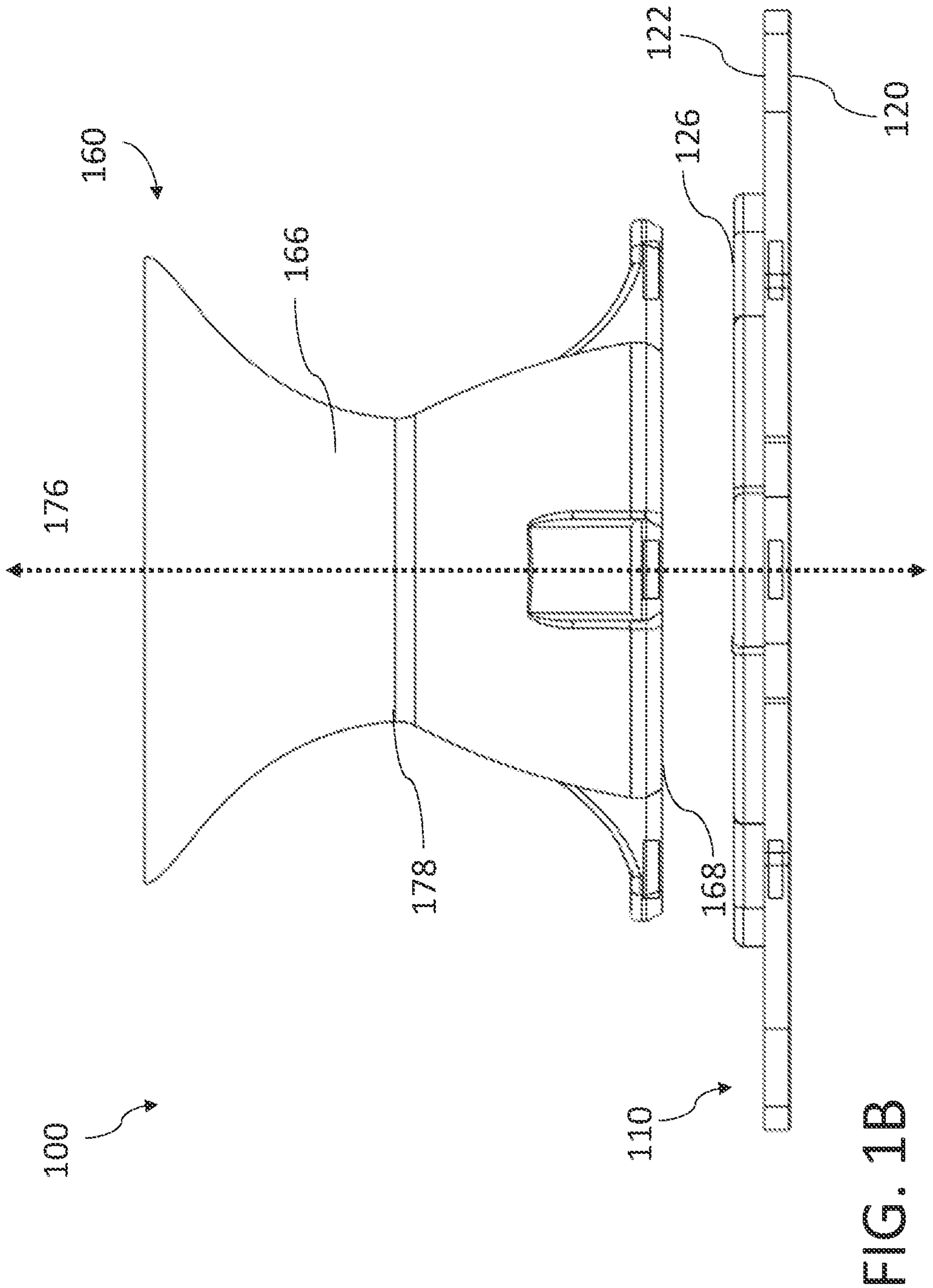
FIG. 1B illustrates an exploded side view of an apparatus for securing a clay workpiece to a pottery wheel, according to some embodiments.

FIG. 1A illustrates a partially-exploded isometric view of an apparatus 100 for securing a clay workpiece to a pottery wheel, according to some embodiments. The apparatus 100 may include a base plate 110 and a clay holding member 160. The base plate 110 may include one or more first alignment features 112*a*, 112*b*, 112*c* (generally referred to as the first alignment feature 112) and one or more second alignment features 114*a*, 114*b*, 114*c* (generally referred to as the second alignment feature 114) In some embodiments, one or both of first and second alignment features 112, 114 may be configured to at least partially receive a locating pin of a pottery wheel (not shown in FIG. 1A). The first alignment feature 112 and the second alignment feature 114, in such an embodiment may also be referred to as a "pin coupling recess." It is contemplated, however, that one or both of first and second alignment features 112, 114 may be otherwise configured to cooperatively engage with a structure of or connected to the pottery wheel. For example, one or both of first and second alignment features 112, 114 may include protrusions that cooperatively engage with respective receptacle structures of or connected to the pottery wheel.

Figure 2A:
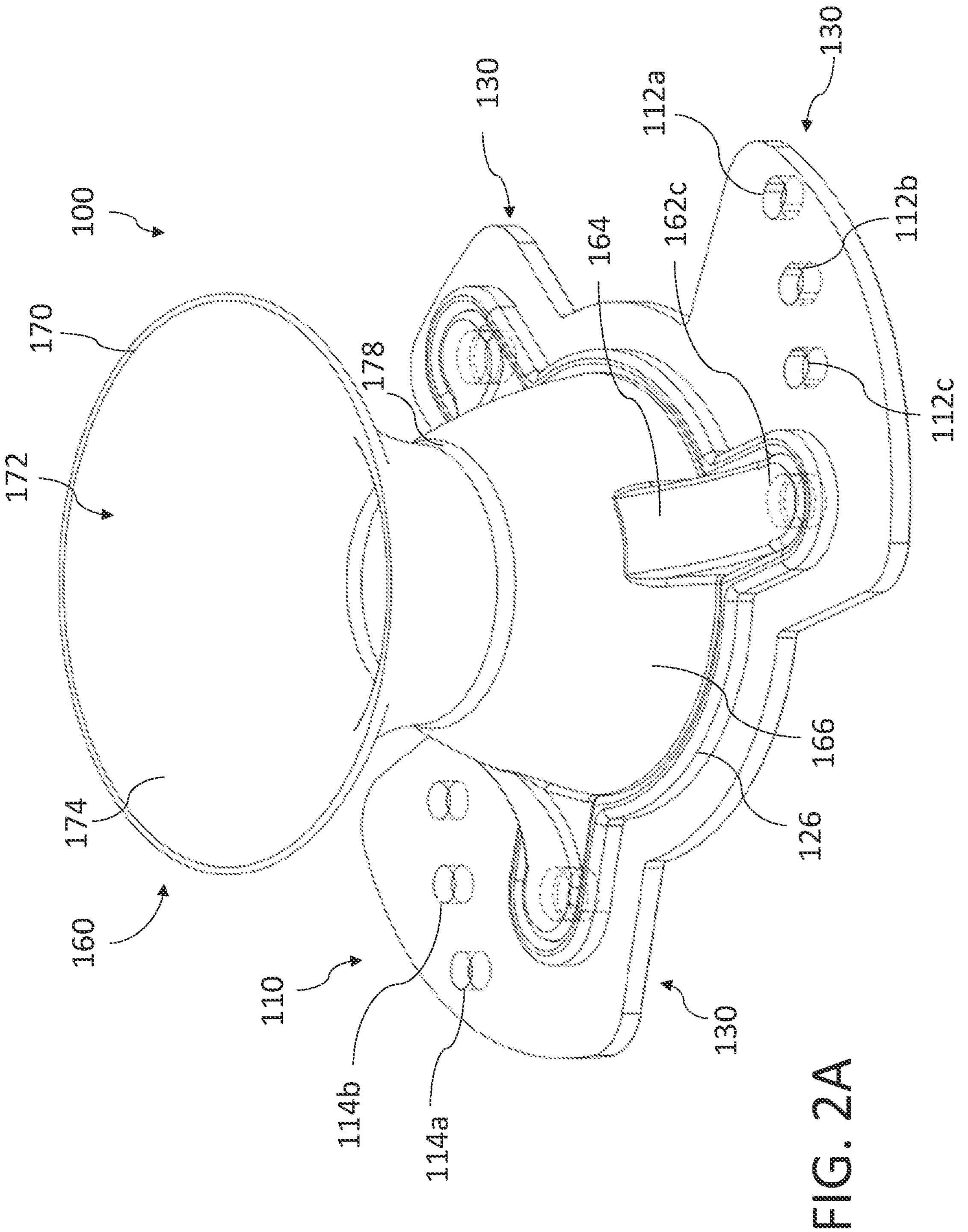
FIG. 2A illustrates an isometric view of an apparatus for securing a clay workpiece to a pottery wheel, according to some embodiments.
Figure 2B:
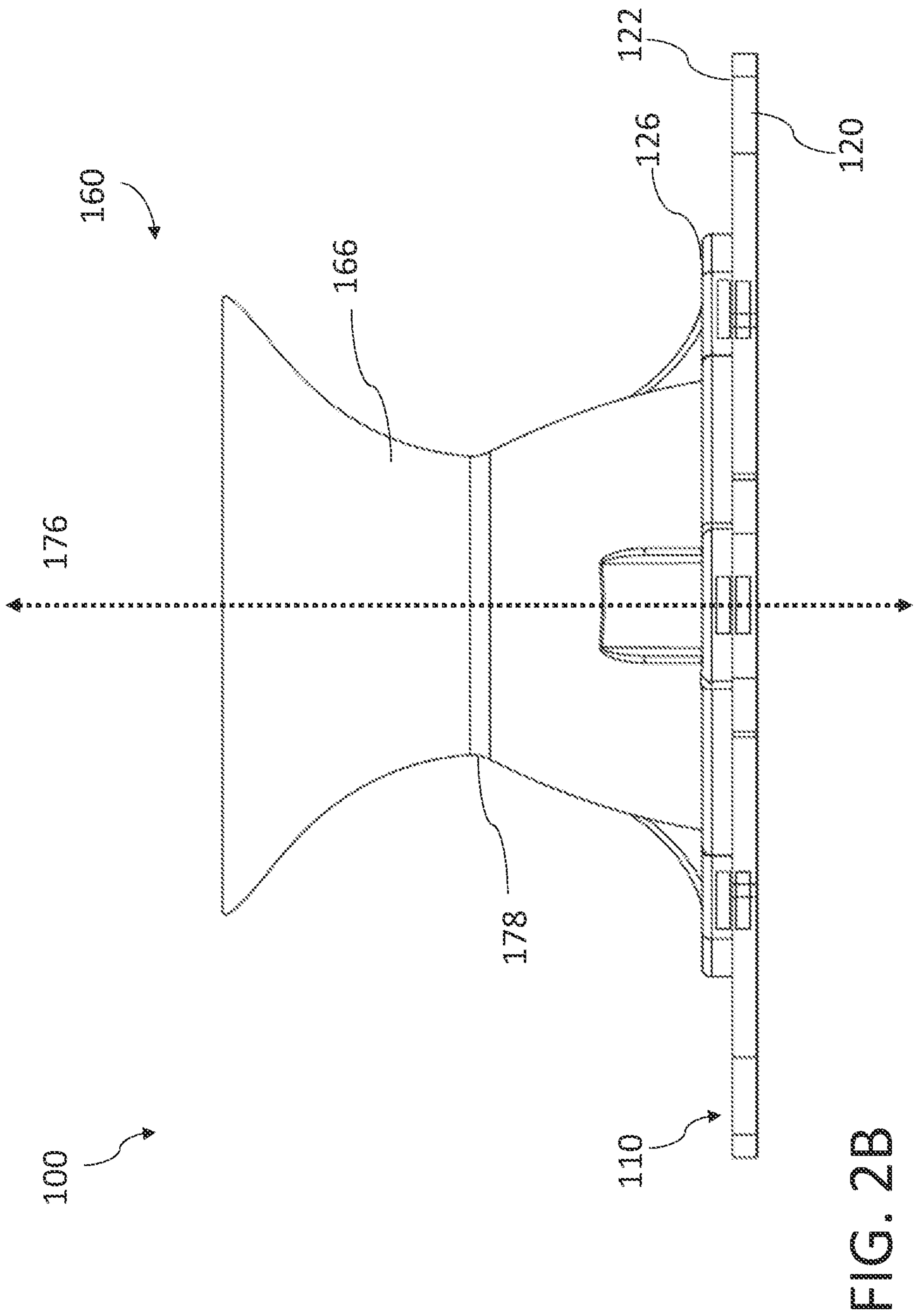
FIG. 2B illustrates a side view of an apparatus for securing a clay workpiece to a pottery wheel, according to some embodiments.
Figure 2C:
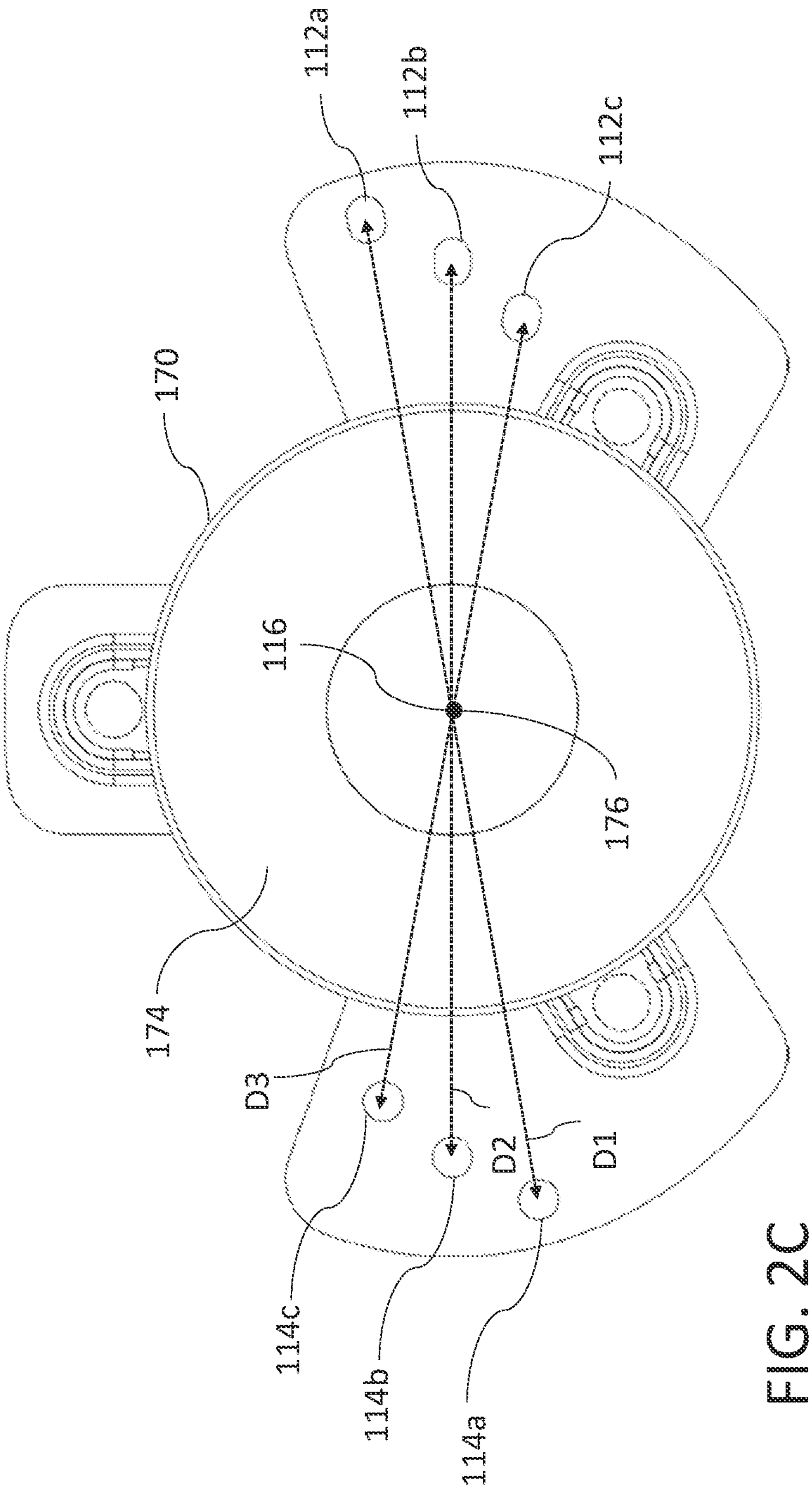
FIG. 2C illustrates a top view of an apparatus for securing a clay workpiece to a pottery wheel, according to some embodiments.

As illustrated in FIG. 2C, respective pair of first and second alignment features 112, 114 define different predetermined spacing dimensions, as will be described in more detail hereinbelow. Spacing between the first alignment feature 112*a* and the second alignment feature 114*a* may be defined by a first distance D1 therebetween that intersects a center point 116 of the base plate 110, with a first spacing dimension. Likewise, spacing between the first alignment feature 112*b* and the second alignment feature 114*b* may be defined by a second distance D2 therebetween, and spacing between the first alignment feature 112*c* and the second alignment feature 114*c* may be defined by a third distance D3 therebetween, wherein the second distance D2 and the third distance D3 also intersect the center point 116 of the base plate 110. Thus, a plurality of alignment feature pairs (112*a*, 114*a*), (112*b*, 114*b*), and (112*c*, 114*c*) may be formed, each of which may engage with cooperating features of or connected to the pottery wheel to align the center point 116 of the base plate 110 with an axis of rotation 150 of the pottery wheel. In doing so, eccentric movement of center point 116 may be substantially avoided when base plate 110 is rotated with the pottery wheel about the axis of rotation 150.

The base plate 110 may include a bottom surface 120 configured to engage with the pottery wheel, and a mounting surface 122 (i.e., top surface) configured to engage with the clay holding member 160. In some embodiments, the bottom surface 120 may be planar and sit flat against the pottery wheel. In other embodiments, bottom surface 120 may be configured to cooperatively engage with a portion of or a body connected to the pottery wheel. The base plate 110 may include one or more wing elements 130 projecting radially outward from a central region of base plate 110 that includes the center point 116. Wing elements 130 may be configured to contact the pottery wheel and provide stability as the base plate 110 rotates with the pottery wheel.

The base plate 110 may include one or more first engagement features configured to removably secure the clay holding member 160 to the base plate 110. For instance, the mounting surface 122 may include a cavity 124 to partially receive the clay holding member 160 therein. In some embodiments, the cavity 124 may be defined by a ridge 126 protruding upward from the mounting surface 122. In some embodiments, the cavity 124 may be cut into the mounting surface 122, i.e., the cavity 124 is located between the mounting surface 122 and the bottom surface 120 and/or the wheel head of the pottery wheel. The cavity 124 may be configured to center the clay holding member 160 on the base plate 110 and at least partially secure the clay holding member 160 onto the base plate 110. In some embodiments, the cavity 124 may include one or more channels 132 configured to receive an arm 164 of the clay holding member 160. The channels 132 may be located on the wing elements 130 of the base plate 110. The cavity 124 may include one or more at least partially circumferential walls (defined by the ridge 126 in FIG. 1A), wherein the center 116 of the base plate 110 is located at a distance r from each of the at least partially circumferential walls. Thus, the at least partially circumferential walls form a circumference having a radius r, the circumference centered at the center 116 of the base plate 110.

In some embodiments, a first engagement feature (or "first fastener(s)") of the base plate 110 may include a first magnet 128 configured to magnetically couple with a second magnet 162 disposed on the clay holding member 160. As illustrated in FIG. 1A, a plurality of first magnets 128*a*, 128*b*, 128*c* may be embedded in or otherwise secured to base plate 110, and may, in some embodiments, be positioned in or near channels 132 of base plate 110. First magnets 128*a*, 128*b*, 128*c* may be arranged and configured to magnetically couple with respective ones of a plurality of second magnets 162*a*, 162*b*, 162*c*. Second magnets 162*a*, 162*b*, 162*c* may be embedded in or otherwise secured to clay holding member 160, and may, in some embodiments, be positioned at or near one or more arms 164 of clay holding member 160. In the illustrated embodiment, magnetic coupling between first and second magnets 128, 162 may be facilitated by positioning respective magnetically coupleable pairs at regions of base plate 110 and clay holding member 160 that may be placed into proximity with one another when clay holding member is received at cavity 124 of mounting surface 122. For instance, one or more of first magnets 128*a*, 128*b*, 128*c* may be positioned at channels 132, and one or more of second magnets 162*a*, 162*b*, 162*c* may be positioned at arms 164 so that magnetic coupling is facilitated when arms 164 are operably received at respective channels 132. Magnetically coupling the plurality of first magnets 128*a*, 128*b*, 128*c* to the plurality of second magnets 162*a*, 162*b*, 162*c* may preferably center the clay holding member 160 on the base plate 110, with center point 116 along axis of rotation 150, and may removably secure the clay holding member 160 onto the base plate 110. In some embodiments, the second magnet 162 may be located on the arm 164 of the clay holding member 160.

The base plate 110 may include various first engagement features. For instance, the cavity 124 may be configured to engage with the clay holding member 160, and a force fit, pressure fit, and/or friction fit may be formed between the walls of the cavity 124 and the clay holding member 160. In some embodiments, the first engagement feature may include a mechanical fastener, i.e., a clamp, clasp, band, pin, threading, spring, or other mechanical feature(s) configured to removably secure the base plate 110 to the clay holding member 160.

The clay holding member 160 may include a body 166 defined by one or more at least partially circumferential walls and a base 168 configured to contact the base plate 110. The body 166 may extend from the base 168 to an upper surface 170 (i.e., a lip). In some embodiments, the body 166 may include an at least partially circumferential wall extending from the base 168 to the upper surface 170. The clay holding member 160 includes an opening 172 at the upper surface 170 extending into the body 166 and an inner surface 174 defining a tapered shape. The tapered shape may be symmetric about an axis of symmetry 176 extending through the opening 172. The clay holding member 160 may include one or more second engagement features (or "second fastener(s)") removably securable to the first engagement feature(s) of the base plate 110. The second engagement feature of the clay holding member 160 may include the second magnet 162, the arm 164, and/or the base 168 configured to engage the cavity 124. In some embodiments, the second engagement feature may include a mechanical fastener, i.e., a clamp, clasp, band, pin, threading, spring, or other mechanical feature(s) configured to removably secure the base plate 110 to the clay holding member 160.

In some embodiments, the tapered shape of the inner surface 174 may flare outward as vertical distance from the base 168 increases. For instance, at ring 178, the inner surface 174 may have a first diameter, and at the upper surface 170, the inner surface 174 has a second diameter greater than the first diameter. In some embodiments, the tapered, or outward flare, of the inner surface 174 may be conical. In other embodiments, the tapered, or outward flare, of the inner surface 174 may define a bell-shaped curve or a parabolic curve. In some embodiments, the inner surface 174 may include clay engaging features such as grooves, detents, channels, ridges, or other surface protrusions or texture configured to engage and support the clay workpiece. In some embodiments, a third diameter of inner surface 174 at the base 168 may be greater than the first diameter. Externally, the diameter of the upper surface 170 may be greater than the ring 178. In other embodiments, the diameter of the ring 178 may be greater than or equal to the diameter of the base 168.

The axis of symmetry 176 of the inner surface 174 may be alignable with the center point 116 of the base plate 110 when the first engagement features of the base plate 110, and, in some embodiments, when first and second engagement features are mutually engaged. For instance, the cavity 124 may urge or guide the clay holding member 160 to align the axis of symmetry 176 with the center point 116, and, consequently, axis of rotation 150. In some embodiments, the plurality of first magnets 128*a*, 128*b*, 128*c* may be configured to align the axis of symmetry 176 with the center point 116. Thus, securing the clay holding member 160 to the base plate 110 may automatically align the axis of symmetry 176 with the center 116, as the first engagement features of the base plate 110 urge the clay holding member 160 into a centered positioned. In other words, the respective configurations of the base plate 110 and the clay holding member 160 may be such that it is impossible to secure the clay holding member 160 to the base plate 110 without concurrently aligning the axis of symmetry 176 with the center 116.

As illustrated in FIGS. 2A-2B, the base 168 of the clay holding member 160 may be received by the cavity 124 of the base plate 110, i.e., the clay holding member 160 may mate with the base plate 110. The mating of the base plate 110 with the clay holding member 160 may center the clay holding member 160 on the base plate 110 and/or may provide stability or a connection force to keep the clay holding member 160 and the base plate 110 secured together during the clay trimming process. The mating of the base plate 110 with the clay holding member 160 may align other first engagement features of the base plate 110 with corresponding second engagement features of the clay holding member 160. For example, the mating may align the first magnet 128 of the base plate 110 with the second magnet

162 of the clay holding member 160. In some embodiments, the successful mating of the base plate 110 with the clay holding member 160 may generate tactile or auditory feedback to the potter, e.g., a click sensation or sound, when the base plate 110 is successfully mated with the clay holding member 160. The tactile or auditory feedback may be generated by a force fit between the base 168 and the base plate 110 and/or a by the magnetic coupling of the first magnet 128 with the second magnet 162.

It is also contemplated that apparatus 100 may comprise a single unit that is engageable with features of the pottery wheel to operably align axis of symmetry 176 of clay holding member 160 with axis of rotation 150 of the pottery wheel. An advantage of the multi-component apparatus of the illustrated embodiment is to enable the clay holding member 160 to be cleaned between uses without the need to re-set alignment with the pottery wheel. The base plate 110, by remaining secured to the pottery wheel, maintains an automatic aligning connection of the clay holding member 160 to the pottery wheel.

FIG. 2C illustrates a top view of the apparatus 100 for securing a clay workpiece to a pottery wheel described in FIGS. 2A-B. The first alignment feature 112*a* and the second alignment feature 114*a* define a first distance D1 therebetween, the first alignment feature 112*b* and the second alignment feature 114*b* define a second distance D2 therebetween, and the first alignment feature 112*c* and the second alignment feature 114*c* define a third distance D3 therebetween, wherein the first distance D1, second distance D2, and the third distance D3 intersect the center point 116 of the base plate 110 and the axis of symmetry 176 of the inner surface 174. Thus, a plurality of alignment feature pairs (112*a*, 114*a*), (112*b*, 114*b*), and (112*c*, 114*c*) may be formed to accommodate different pottery wheels. For instance, pottery wheels typically include locating pins spaced at either 8 inches, 9 inches, or 10 inches apart from each other. Thus, the plurality of alignment feature pairs (112*a*, 114*a*), (112*b*, 114*b*), and (112*c*, 114*c*) may be formed for accommodate a variety of pottery wheel designs, including those with 8 inch, 9 inch, and 10 inch spacing of the locating pins.

The first alignment features 112 may include an elongated opening whereas the second alignment features 114 may include a circular opening (or vice-versa). This pairing may compensate for potential tolerance issues between the locating pins and the alignment features. For instance, if manufacturing errors exist for either the base plate 110 or the locating pins of the pottery wheel, the elongated opening provides additional tolerance when securing base plate 110 to the pottery wheel.

Figure 3A:
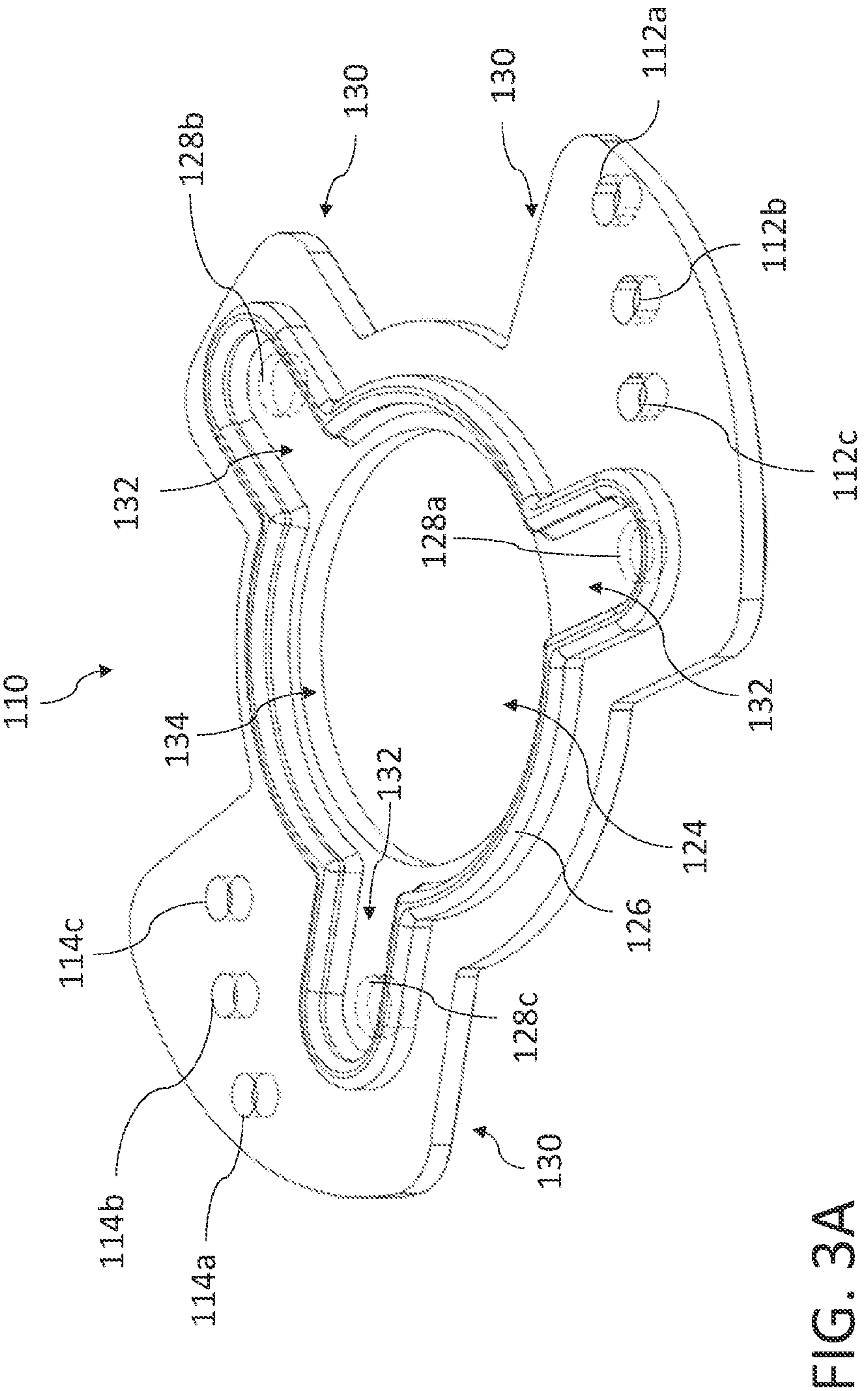
FIG. 3A illustrates an isometric view of a base plate for securing a clay workpiece to a pottery wheel, according to some embodiments.
Figure 3B:
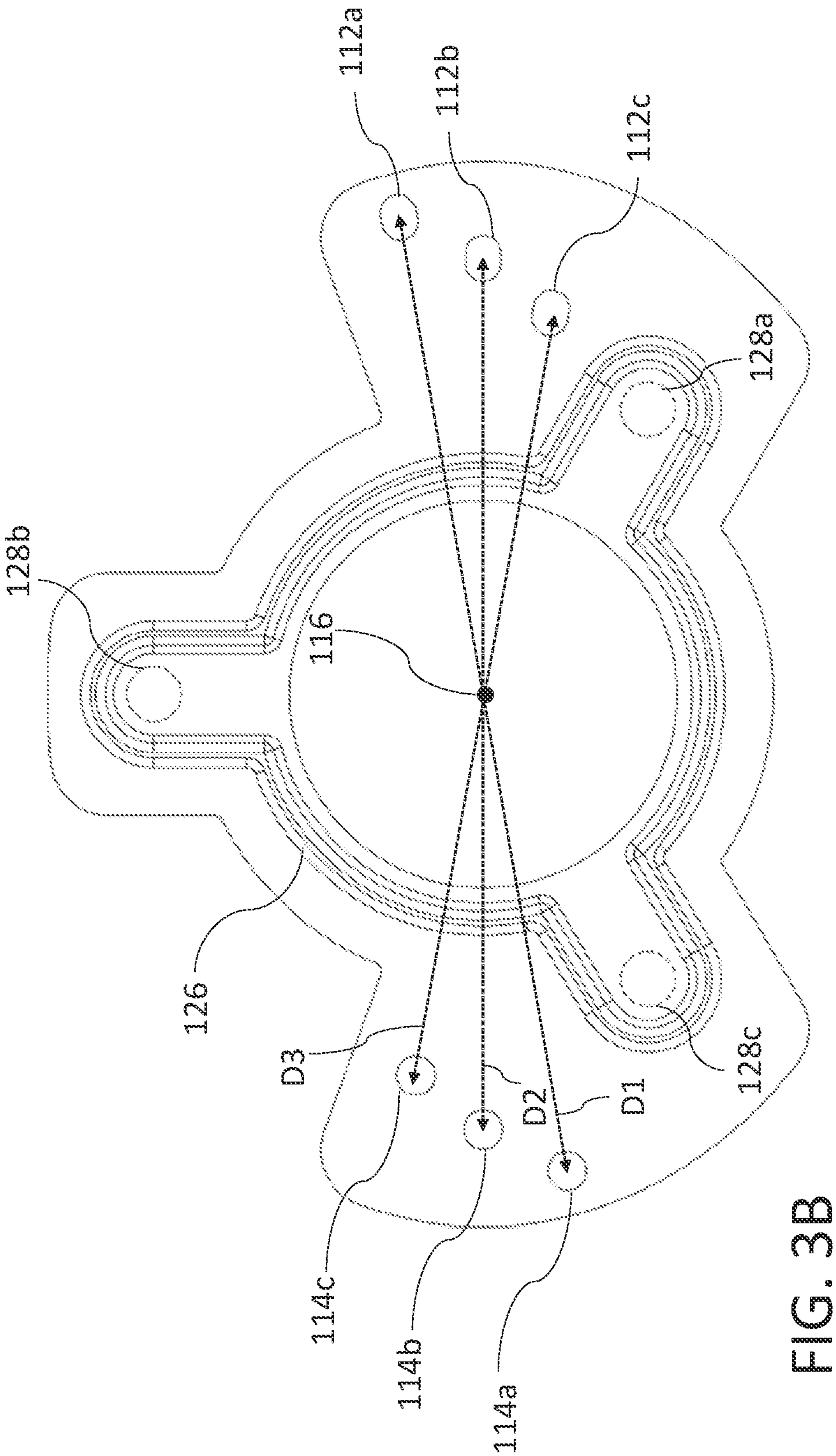
FIG. 3B illustrates a top view of a base plate for securing a clay workpiece to a pottery wheel, according to some embodiments.

FIGS. 3A-B illustrate isolated views of the base plate 110, according to some embodiments. The cavity 124 includes the ridge 126 and a cutout portion 134. In some embodiments, the cutout portion 134 of the base plate 110 may reduce material cost, overall weight of the apparatus, and allow for easy cleaning of the base plate 110 as excess clay falls to the pottery wheel head instead of the base plate 110.

Figure 4:
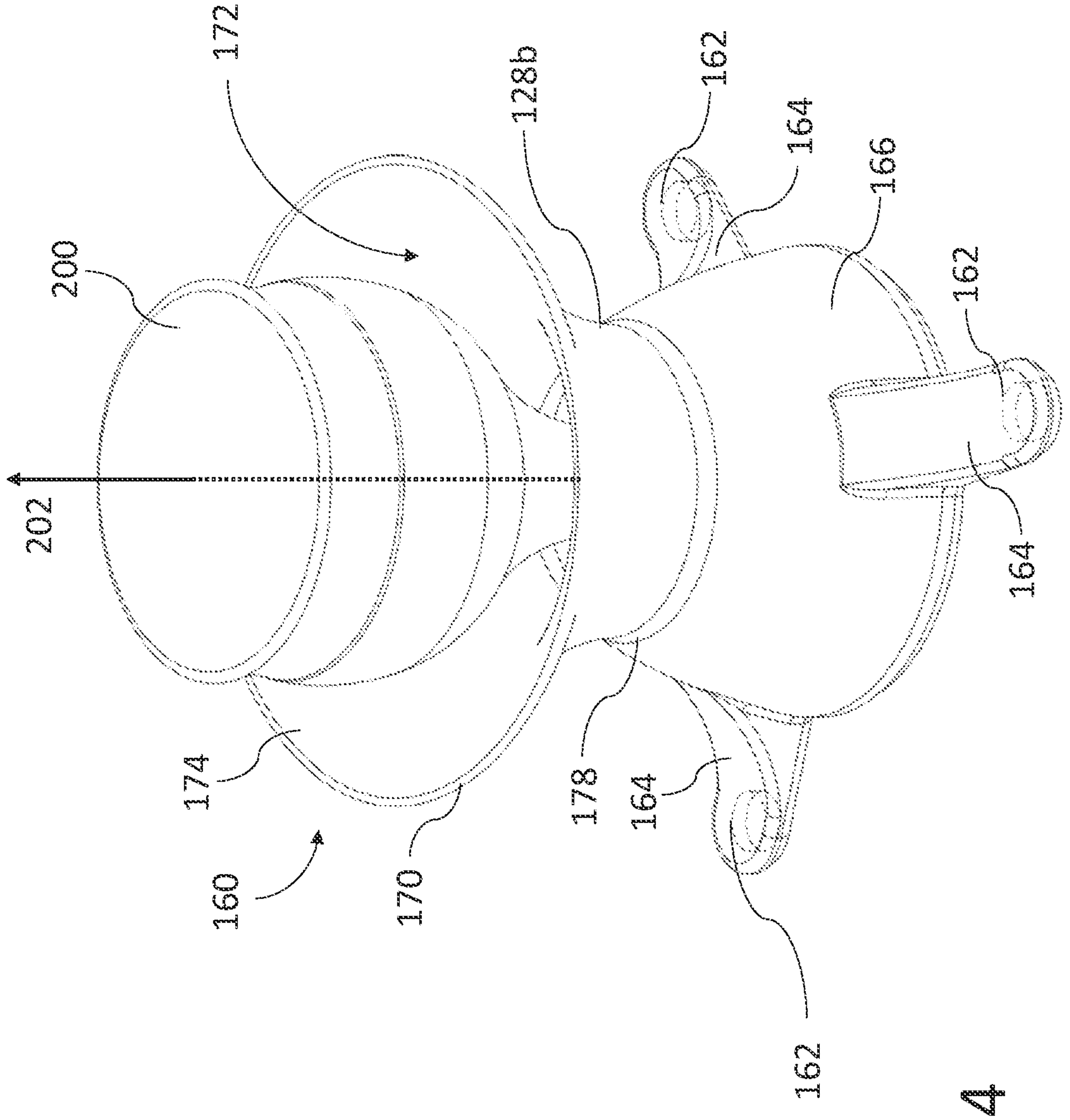
FIG. 4 illustrates an isometric view of a clay holding member and a clay workpiece, according to some embodiments.

FIG. 4 illustrates the clay holding member 160 shown in FIGS. 1A-2C receiving a clay workpiece 200. The clay workpiece 200 may be inserted into the opening 172 top-down to expose a bottom surface 202 of the clay workpiece 200. The inner surface 174 of the clay holding member 160 may engage with and provide support to the clay workpiece 200. The tapered shape of the inner surface 174 may be configured to distribute load of the clay workpiece 200 over a larger area, and thus, prevent the clay workpiece 200 from deforming or collapsing under the load force. For example, instead of the lip or top surface of the clay workpiece bearing the entire load force, the inner surface 174 may engage with a side wall of the clay workpiece, which is typically a stronger structural portion than the top lip. Thus, load force is distributed over a larger surface area of the clay workpiece 200, and distributed in a stronger portion of the clay workpiece 200.

The inner surface 174 may urge the clay workpiece 200 to be centered relative to the clay holding member 160. The potter may manipulate the clay workpiece 200 via tapping or adjusting to align an axis of symmetry 202 of the clay workpiece 200 with the axis of symmetry 176. It should be understood that the clay workpiece 200 illustrated in FIGS. 4 and 5B is merely exemplary. Various clay workpieces may be supported by the clay holding member 160, including but not limited to, bowls, plates, cups, mugs, cylinders, vases, vessels, bottles, pitchers, and other wheel-thrown clay pieces.

Figure 5A:
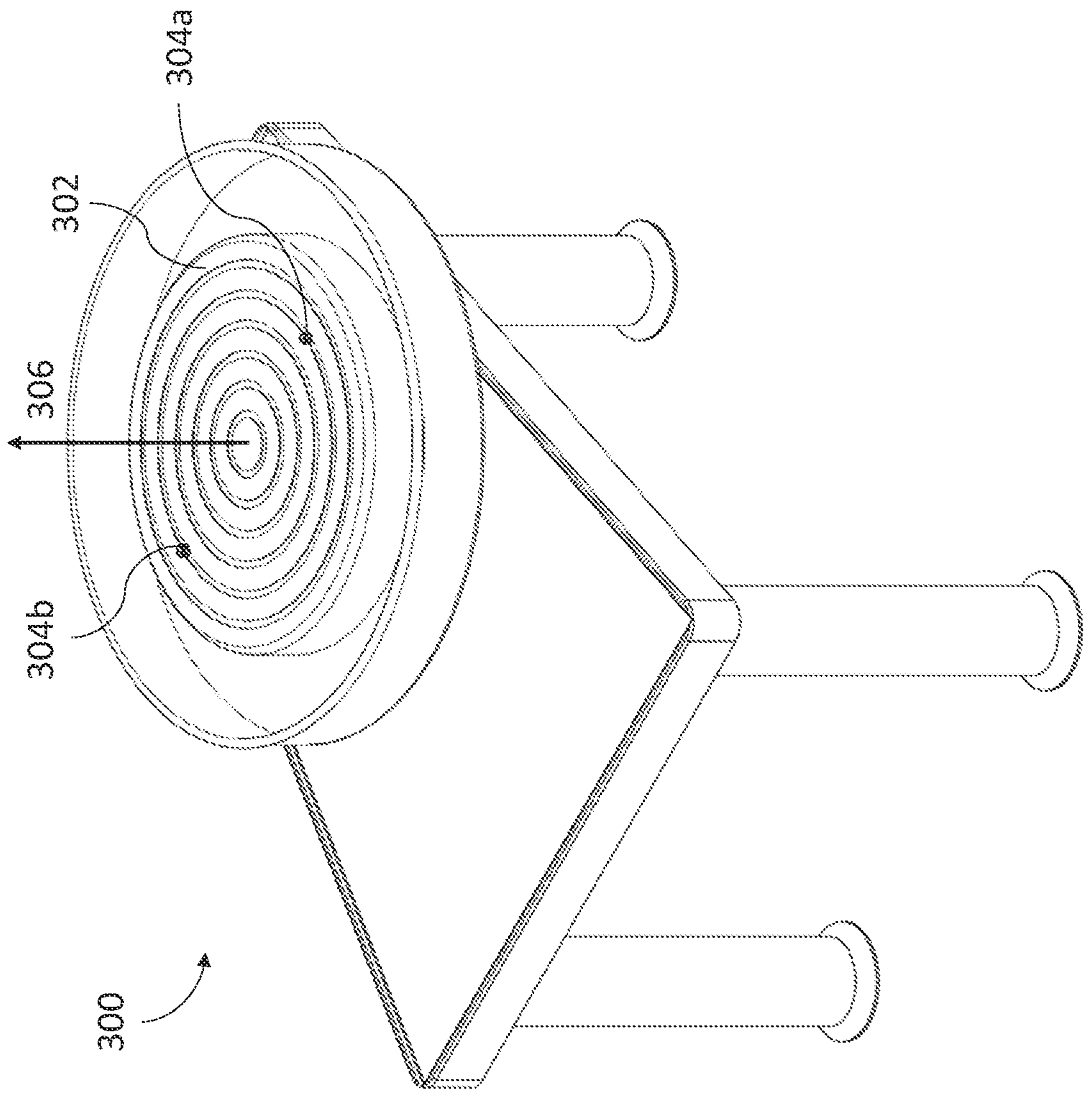
FIG. 5A illustrates an isometric view of a pottery wheel, according to some embodiments.
Figure 5B:
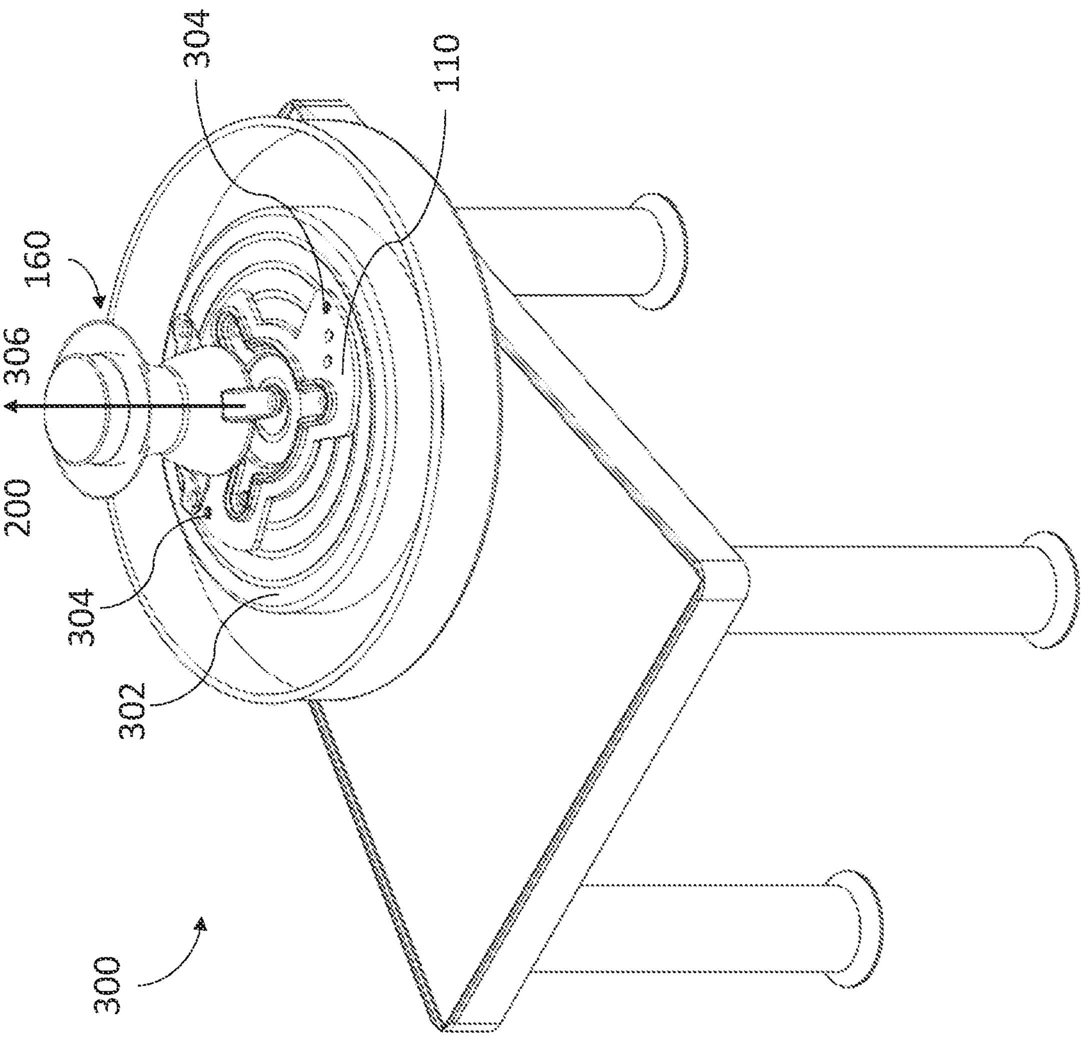
FIG. 5B illustrates an isometric view of a pottery wheel and an apparatus for securing a clay workpiece to a pottery wheel, according to some embodiments.

FIGS. 5A-B illustrate a pottery wheel 300 including a wheel head 302 having locating pins 304*a*, 304*b*. The wheel head 302 is configured to rotate about an axis of rotation 306. FIG. 5B shows the apparatus 100 for securing a clay workpiece 200 to the pottery wheel 300, as described in FIGS. 1A-4, removably secured to the pottery wheel 300. In the embodiment shown in FIG. 5B, the first alignment feature 112 and the second alignment feature 114 at least partially receive the locating pins 304*a*, 304*b* therein. The first alignment feature 112 and the second alignment feature 114 mate with the locating pins 304*a*, 304*b* to align the center 116 of the base plate 110 with the axis of rotation 306. The clay supporting member 160 is removably securable to the base plate 110, and one or more first engagement features of the base plate 110 are configured to urge the clay supporting member 160 into a centered position relative to the base plate 110, i.e., the axis of symmetry 176 of the inner surface is aligned with the center 116 of the base plate 110. The clay workpiece 200 may be placed on or within the clay holding member 160 and the axis of symmetry 202 of the clay workpiece 200 may be aligned with the axis of symmetry 176 of the clay holding member 160. Thus, the axis of rotation 306 may be aligned with the center 116 of the base plate 110, the axis of symmetry 176 of the clay holding member 160, and the axis of symmetry 202 of the clay workpiece 200.

Figure 6A:
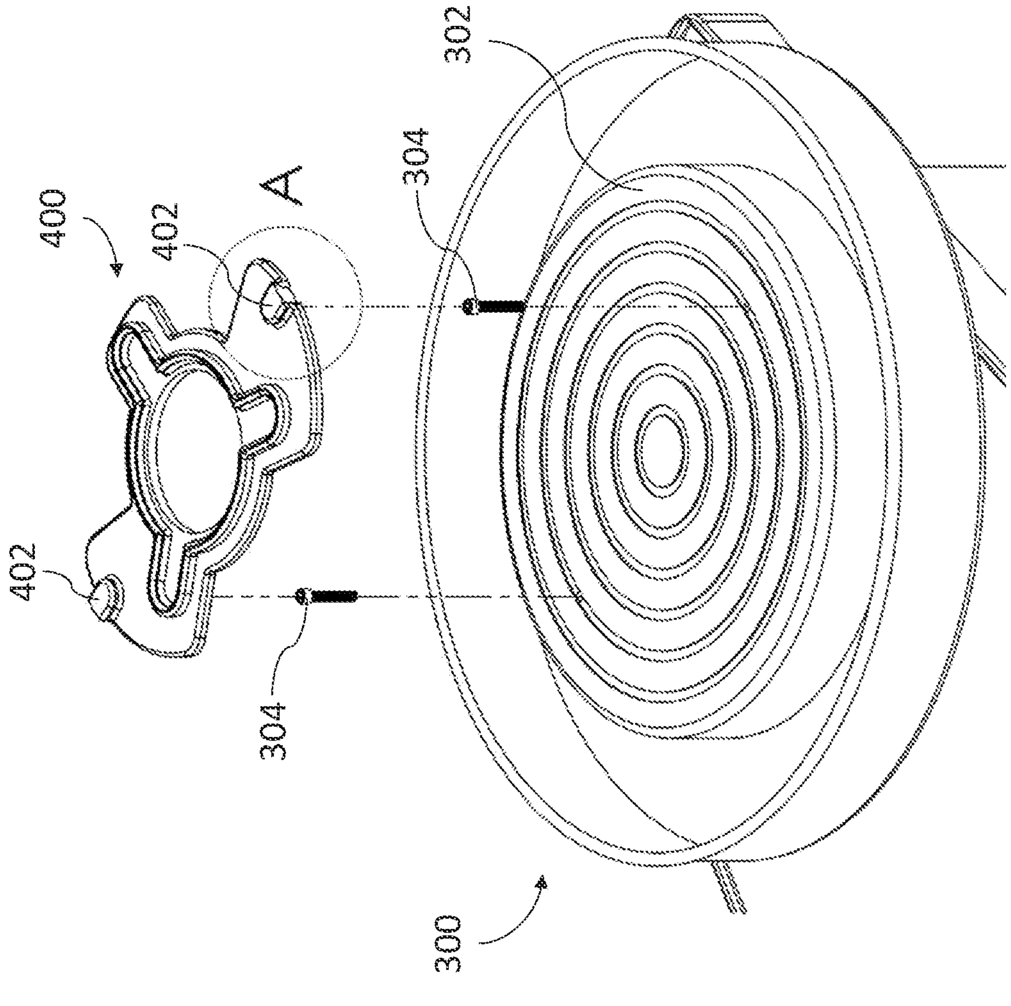
FIG. 6A illustrates an isometric view of a base plate positioned relative to a pottery wheel, according to some embodiments.
Figure 6B:
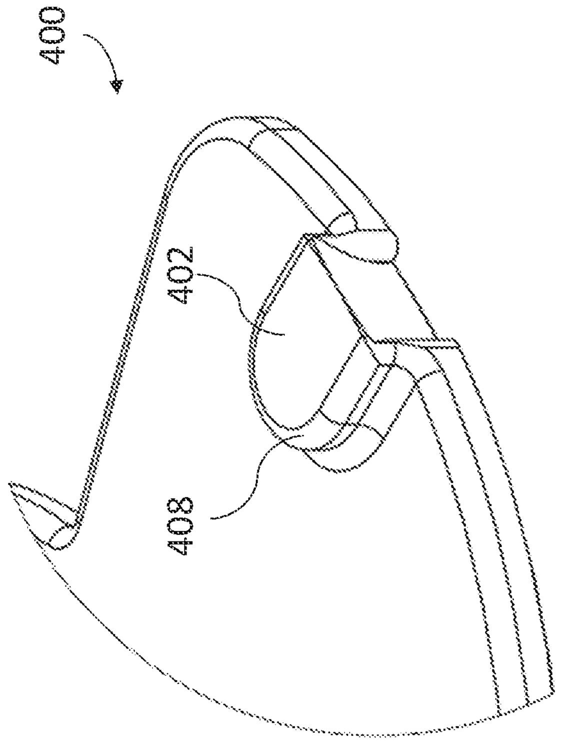
FIG. 6B illustrates a magnified isometric view of a base plate, according to some embodiments.
Figure 6C:
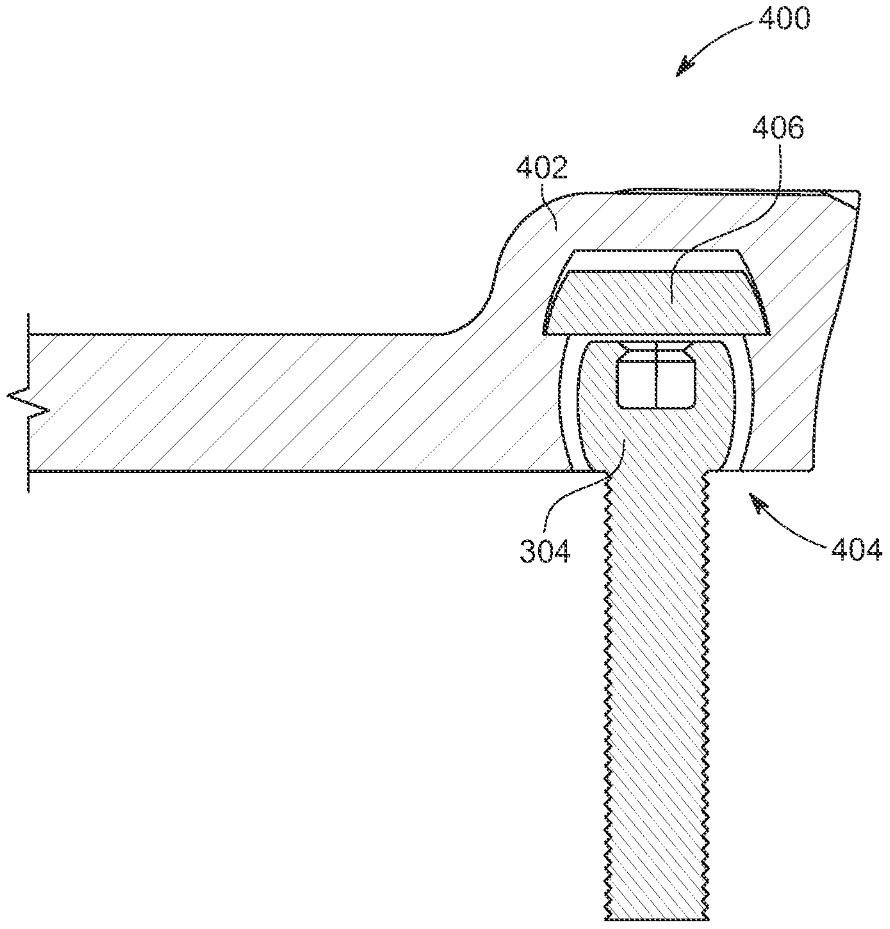
FIG. 6C illustrates a partial cross sectional view of a base plate including a magnet, according to some embodiments.

FIGS. 6A-C illustrates a base plate 400 including an alignment feature 402, according to some embodiments. The alignment feature 402 of the base plate 400 may include a recess 404 configured to receive the locating pin 304 of the pottery wheel head 302 therein. In some embodiments (see e.g., FIG. 6C), the base plate 400 may include a magnet 406 positioned adjacent to the recess 404. The magnet 406 may be configured to magnetically couple with one or more of the locating pin 304 and/or the wheel head 302 of the pottery wheel 300, and thus, the magnet 406 may provide additional coupling strength to secure the base plate 400 to the pottery wheel 300. In some embodiments, base plate 400 may include a protrusion 408 to house the magnet 406.

Figure 7:
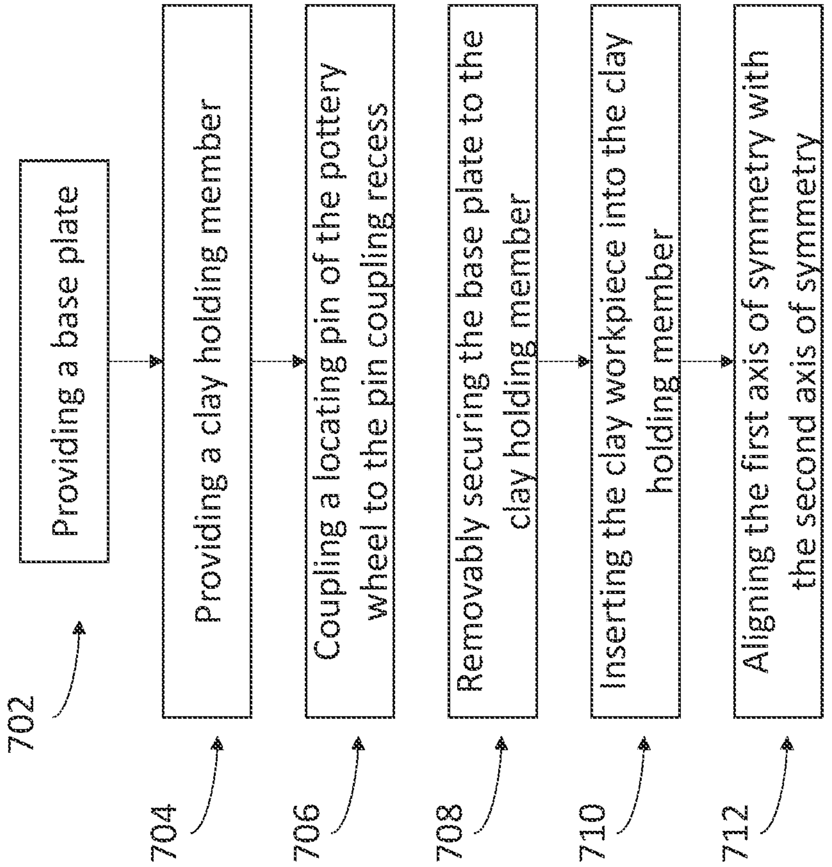
FIG. 7 is a flow diagram illustrating a process for securing a clay workpiece to a pottery wheel.

FIG. 7 illustrates a flow chart of a method 700 for centering a clay workpiece on a pottery wheel, according to some embodiments. The method 700 includes step 702, providing a base plate. The base plate may include any of the features described in FIGS. 1A-6C. The method 700 includes step 704, providing a clay holding member. The clay holding member may include any of the features described in FIGS. 1A-6C. The method 700 includes step 706, coupling a locating pin of the pottery wheel to the pin coupling recess of the base plate. Coupling the locating pin to the pin coupling recess may center the base plate relative to an axis of rotation of the pottery wheel. The method 700 includes step 708, removably securing the base plate to the clay holding member. Step 708 may include securing the first engagement feature of the base plate the second engagement feature of the clay holding member. For example, a first magnet 128 configured to magnetically couple with a second magnet 162 disposed on the clay holding member 160 and/or the cavity 124 may be configured to engage with the clay holding member 160, and a force fit, pressure fit, and/or friction fit may be formed between the walls of the cavity 124 and the clay holding member 160. The method 700 includes step 710, inserting the clay workpiece into the clay holding member. The clay workpiece may be partially inserted into the opening of the clay holding member. The method 700 includes step 712, aligning a first axis of symmetry with a second axis of symmetry. The first axis of symmetry may be defined by the inner surface of the clay holding member having a tapered shape. The clay workpiece may define the second axis of symmetry.

The above Detailed Description includes references to the accompanying drawings, which form a part of the Detailed Description. The Detailed Description should be read with reference to the drawings. The drawings show, by way of illustration, specific embodiments in which the present devices, systems, and methods can be practiced. These embodiments are also referred to herein as "examples."

The Detailed Description is intended to be illustrative and not restrictive. For example, the above-described examples (or one or more features or components thereof) can be used in combination with each other. Other embodiments can be used, such as by one of ordinary skill in the art upon reviewing the Detailed Description and accompanying drawings. Also, various features or components have been or can be grouped together to streamline the disclosure. This should not be interpreted as intending that an unclaimed disclosed feature is essential to any claim. Rather, inventive subject matter can lie in less than all features of a disclosed embodiment. Thus, the following claims are hereby incorporated into the Detailed Description, with each example standing on its own as a separate embodiment:

In Example 1, a device for securing a clay workpiece to a pottery wheel includes a base plate and a clay holding member. The base plate includes an alignment feature to at least partially receive a locating pin of the pottery wheel. The clay holding member includes a body extending from the base plate to an upper surface and an opening at the upper surface extending into the body. The clay holding member includes an inner surface defining a tapered shape. The tapered shape is symmetric about an axis of symmetry of the inner surface. The alignment feature is configured to align the axis of symmetry of the inner surface within an axis of rotation of the pottery wheel.

In Example 2, the device for securing a clay workpiece to a pottery wheel of Example 1 optionally includes the base plate having a mounting surface adjacent the clay holding member, a bottom surface configured to engage the pottery wheel, and a first engagement feature. The first engagement feature is configured to removably secure the clay holding member to the base plate.

In Example 3, the device for securing a clay workpiece to a pottery wheel of Examples 1 or 2 is optionally configured such that the first engagement feature includes a cavity configured to partially receive the clay holding member therein and thereby align the axis of symmetry of the inner surface with the axis of rotation of the pottery wheel.

In Example 4, the device for securing a clay workpiece to a pottery wheel of Examples 1-3 is optionally configured such that the first engagement feature includes a first magnet and the clay holding member includes a second magnet, wherein the first magnet and second magnet are configured to magnetically couple the base plate to the clay holding member.

In Example 5, the device for securing a clay workpiece to a pottery wheel of Examples 1~4 is optionally configured such that the clay holding member includes a plurality of arms extending radially from the body, wherein each of the plurality of arms is removably securable to the base plate.

Example 6, the device for securing a clay workpiece to a pottery wheel of Examples 1-5 is optionally configured such that the alignment feature includes a magnet configured to magnetically couple with the locating pin of the pottery wheel.

Example 7, the device for securing a clay workpiece to a pottery wheel of Examples 1-6 is optionally configured such that the clay holding member is removable from the pottery wheel independent of the base plate.

Example 8, the device for securing a clay workpiece to a pottery wheel of Examples 1-7 is optionally configured such that the opening is configured to receive the clay workpiece therein and the inner surface is configured to engage with a wall of the clay workpiece.

Example 9, the device for securing a clay workpiece to a pottery wheel of Examples 1-8 is optionally configured such that the tapered shape includes a cross section defining a bell-shaped curve.

In Example 10, a system for centering a clay workpiece on a pottery wheel includes a locating pin, a base plate, and a clay holding member. The locating pin is disposed on a wheel head of the pottery wheel. The base plate includes a pin coupling recess to receive the locating pin and a first engagement feature. The clay holding member includes an opening, an inner surface, and a second engagement feature. The inner surface defines a tapered shape symmetric about an axis of symmetry. The second engagement feature is removably securable to the first engagement feature. The clay holding member is removable from the pottery wheel independent of the base plate. Coupling the locating pin to the pin coupling recess aligns the axis of symmetry of the inner surface to an axis of rotation of the pottery wheel.

In Example 11, the system for centering a clay workpiece on a pottery wheel of Example 10 is optionally configured such that the base plate includes a bottom surface to engage the pottery wheel and a mounting surface including cavity to partially receive the clay holding member therein.

In Example 12, the system for centering a clay workpiece on a pottery wheel of Examples 10-11 is optionally configured such that the first engagement feature includes a first magnet and the second engagement feature includes a second magnet, the first magnet and the second magnet configured to magnetically secure the base plate to the clay holding member.

In Example 13, the system for centering a clay workpiece on a pottery wheel of Examples 10-12 is optionally configured such that the first engagement feature includes a first mechanical fastener and the second engagement feature is removably securable to the first mechanical fastener.

In Example 14, the system for centering a clay workpiece on a pottery wheel of Examples 10-13 is optionally configured such that the second engagement feature includes a plurality of arms configured to removably secure to the first engagement feature.

In Example 15, the system for centering a clay workpiece on a pottery wheel of Examples 10-14 is optionally configured such that the opening is configured to receive the clay workpiece therein and the inner surface of the opening supports a wall of the clay workpiece, wherein an axis of symmetry of the clay workpiece is alignable with the axis of rotation of the pottery wheel.

In Example 16, a method for centering a clay workpiece on a pottery wheel includes providing a base plate and a clay holding member. The base plate includes a pin coupling recess. The clay holding member includes an opening and an inner surface. The inner surface defines a tapered shape symmetric about a first axis of symmetry. The method includes coupling a locating pin of the pottery wheel to the pin coupling recess, removably securing the base plate to the clay holding member, and inserting the clay workpiece into the opening of the clay holding member. The clay workpiece includes a second axis of symmetry. The method further includes aligning the first axis of symmetry with the second axis of symmetry.

In Example 17, the method for centering a clay workpiece on a pottery wheel of Example 16 is optionally configured such that coupling the locating pin of the pottery wheel to the pin coupling recess centers the base plate relative to an axis of rotation of the pottery wheel.

In Example 18, the method for centering a clay workpiece on a pottery wheel of Examples 16-17 is optionally configured such that the clay holding member includes a plurality of arms, wherein each of the plurality of arms is configured to removably secure to the base plate via an attachment mechanism.

In Example 19, the method for centering a clay workpiece on a pottery wheel of Examples 16-18 is optionally configured such that removably securing the base plate to the clay holding member includes magnetically coupling the base plate to the clay holding member.

In Example 20, the method for centering a clay workpiece on a pottery wheel of Examples 16-19 is optionally configured such that the inner surface of the clay holding member supports a side wall of the clay workpiece.

In Example 21, an apparatus for securing a clay workpiece to a pottery wheel includes a base plate, a first fastener, a clay holding member, and a second fastener. The base plate includes a first engagement feature and at least two alignment features. The alignment features are engageable with corresponding locating pins at the pottery wheel to secure the base plate to the pottery wheel symmetric about an axis of rotation of the pottery wheel. The first fastener is secured to the alignment plate. The clay holding member includes a base and an at least partial circumferential wall extending from the base to define a support opening spaced from the base. The base is configured for cooperative engagement with the first engagement feature of the base plate. The second fastener is secured to the clay holding member. The second fastener is engageable with the first fastener to removably secure the clay holding member to the base plate such that the at least partial circumferential wall extends circumferentially about the axis of rotation of the pottery wheel.

In Example 22, the apparatus for securing a clay workpiece to a pottery wheel of Example 21 is optionally configured such that the first and second fasteners are magnets of opposite polarity.

In Example 23, the apparatus for securing a clay workpiece to a pottery wheel of Examples 21-22 is optionally configured such that the wall extends symmetrically about the axis of symmetry.

Certain terms are used throughout this patent document to refer to features or components. Different people may refer to the same feature or component by different names. This patent document does not intend to distinguish between components or features that differ in name but not in function.

The scope of the present devices, systems, and methods should be determined with reference to the appended claims, along with the full scope of equivalents to which such claims are entitled. In the appended claims, the terms “including” and “in which” are used as the plain-English equivalents of the respective terms “comprising” and “wherein.” Also, in the following claims, the terms “including” and “comprising” are open-ended; that is, a device, system, or method that includes features or components in addition to those listed after such a term in a claim are still deemed to fall within the scope of that claim. Moreover, in the following claims, the terms “first,” “second” and “third,” etc. are used merely as labels, and are not intended to impose numerical requirements on their objects.

The Abstract is provided to allow the reader to quickly ascertain the nature of the technical disclosure. It is submitted with the understanding that it will not be used to interpret or limit the scope or meaning of the claims.

What is claimed is:

1. A device for securing a clay workpiece to a pottery wheel, the device comprising:

a base plate having a bottom surface configured to engage the pottery wheel, and a generally opposed mounting surface, the base plate including an alignment feature configured to at least partially receive a locating pin of the pottery wheel, and a first engagement feature including a ridge protruding from the mounting surface to define a cavity at the mounting surface; and a clay holding member including:

a body having a clay support surface arranged circumaxially about a central axis, and a second engagement feature adapted to cooperate with the ridge of the first engagement feature and to be received in the cavity to removably mate the clay holding member to the base plate, the first engagement feature including a first magnet, and the second engagement feature including a second magnet configured to magnetically couple with the first magnet; and wherein the alignment feature is configured to align the central axis with an axis of rotation of the pottery wheel; when the clay holding member is secured to the base plate at the first engagement feature.

2. The device of claim 1, wherein the clay holding member includes a plurality of arms extending radially from the body, wherein each of the plurality of arms is removably securable to the base plate at the first engagement feature.

3. The device of claim 1, wherein the alignment feature includes a magnet configured to magnetically couple with the locating pin of the pottery wheel.

4. The device of claim 1, wherein the clay holding member is removable from the pottery wheel independent of the base plate.

5. The device of claim 1, wherein the body includes a circumferential wall extending from a base to an upper lip that defines an opening to a receptacle within a boundary defined at least in part by the clay support surface of the circumferential wall, wherein the opening is configured to receive the clay workpiece therein and the clay support surface is configured to engage with the clay workpiece.

6. A system for centering a clay workpiece on a pottery wheel, the system comprising:

a base plate including a first engagement feature and a pin coupling recess to receive a locating pin connectable to a wheel head of the pottery wheel;

a clay holding member including:

a body having a second engagement feature including a plurality of arms configured to be removably securable to the first engagement feature, wherein the clay holding member is removable from the pottery wheel independent of the base plate, and the body defining a surface having an axis of symmetry wherein when the locating pin is coupled to the pin coupling recess and the second engagement feature is secured to the first engagement feature, the axis of symmetry of the surface is aligned with an axis of rotation of the pottery wheel.

7. The system of claim 6, wherein the base plate includes:

a bottom surface to engage the pottery wheel, a mounting surface including a cavity to partially receive the clay holding member therein.

8. The system of claim 7, wherein the first engagement feature includes a first magnet with a first polarity, and the second engagement feature includes a second magnet with a second polarity that is opposite from the first polarity, the first magnet and the second magnet configured to magnetically secure the clay holding member to the base plate.

9. The system of claim 7, wherein the first engagement feature includes a first mechanical fastener and the second engagement feature is removably securable to the first mechanical fastener.

10. The system of claim 6, wherein the body includes an opening that is configured to receive the clay workpiece therein and the surface supports the clay workpiece.

11. An apparatus for securing a clay workpiece to a pottery wheel, the apparatus comprising:

a base plate including a first engagement feature and at least two sets of alignment features, each set of alignment features including at least two spaced apart alignment features, a first set of alignment features being spaced apart by a first dimension defined by a straight line passing through a center point of the base plate and connecting two of the alignment features, and a second set of alignment features being spaced apart by a second dimension defined by a straight line passing through the center point of the base plate and connecting two of the alignment features of the second set, the second dimension being greater than the first dimension, and wherein the alignment features are engageable with corresponding locating pins at the pottery wheel to secure the base plate to the pottery wheel so that the center point aligns with an axis of rotation of the pottery wheel;

a first fastener secured to the base plate;

a clay holding member including a base and an at least partial circumferential wall extending from the base to define a support opening spaced from the base, the base being configured for cooperative engagement with the first engagement feature of the base plate; and a second fastener secured to the clay holding member, the second fastener engageable with the first fastener to removably secure the clay holding member to the base plate such that the at least partial circumferential wall extends circumferentially about the axis of rotation of the pottery wheel.

* * * * *